E. G. Nichols,
Fence Post.
No. 90,773.   Patented June 1, 1869.

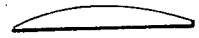
WITNESSES:
Jas. H. Emmons.
G. F. Rucker.
INVENTOR:
Edgar G. Nichols

United States Patent Office.

EDGAR G. NICHOLS, OF BEAUFORT, SOUTH CAROLINA.

Letters Patent No. 90,773, dated June 1, 1869.

IMPROVEMENT IN FENCE-POSTS.

The Schedule referred to in these Letters Patent and making part of the same.

*To whom it may concern:*

Be it known that I, EDGAR G. NICHOLS, of the town of Beaufort, district of Beaufort, and State of South Carolina, have invented a new and useful Improvement in Fence-Posts of iron; and I do hereby declare that the following is a full, clear, and exact description of the construction and operation of the same, reference being had to the annexed drawings, making a part of this specification, in which—

$u$ designates upright, $c$, cross-bar, and $g$, surface of the ground.

Figure 1:
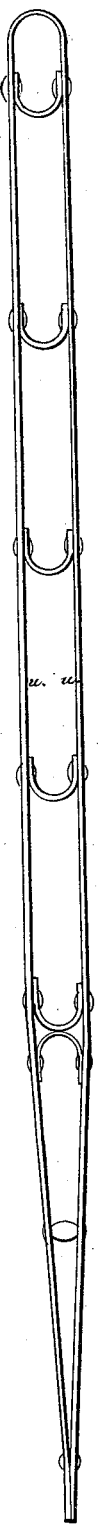

Figure 1 is a side view of a post as I generally make them, the two uprights being formed of the same bar.

Figure 2:
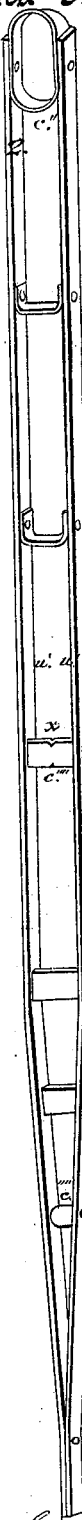

Figure 2, a perspective view of a post as I sometimes make them, the two uprights being formed each of a separate bar.

Figures 3, 4, 5, and 6, full-size cross-sections of iron sometimes used for the uprights and cross-bars. The cross-section may be made greatest about the intersection of the line $g\ g$.

To enable others skilled in the art to make and use my invention, I will proceed to describe its construction and operation.

Figure 6:
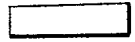
Figure 5:
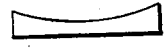
Figure 3:
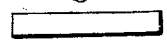

Take a wrought-iron bar of suitable dimensions, say thirteen feet long, and cross-section as shown at fig. 6; make rivet-holes at proper distances; bend the bar to the shape shown at fig. 1; rivet the two ends of the bar together; make and rivet in cross-bars.

The cross-bars may be made of wrought-iron, of cast malleable iron, or of iron cast around short bars of wrought-iron, the latter projecting at each end to rivet.

To prevent rusting, the post may be covered with paint, coal-tar, or any of the usual preservatives, or a piece of zinc may be riveted to the iron near the intersection of the line $g\ g$.

To use the post, set the lower end in the ground to the depth of two feet or more, making the hole for it with an iron bar. When several posts have been set in line, at the distance apart of, say, nine and a half feet, put in boards, rails, or poles, say ten feet long, to form the horizontal, or string-pieces of the fence, or put in only upper and lower string-pieces, and nail perpendicular pieces, or pickets to them, or stretch wires through the posts, taking a turn around the middle of each cross-bar in passing, and the cross-bars may have notches, $x$, at their middles to prevent the slipping of the wires.

What I claim as my invention, and desire to secure by Letters Patent, is—

The fence-post herein described, constructed of one or two bars, as shown in figs. 1 and 2, provided with braces which serve to support the rails or wires, said post being formed wedge shaped at its lower extremity, substantially as and for the purposes set forth.

EDGAR G. NICHOLS.

Witnesses:
G. F. RICKER,
JAS. A. EMMONS.